United States Patent
Sendonaris et al.

(10) Patent No.: US 7,251,467 B2
(45) Date of Patent: Jul. 31, 2007

(54) TELECOMMUNICATIONS USING A TUNABLE OSCILLATOR

(75) Inventors: Andrew Sendonaris, Aglandzia (CY); Da-shan Shiu, Cupertino, CA (US); Dominic Gerard Farmer, Los Gatos, CA (US); Jeremy H. Lin, San Diego, CA (US); Parvathanathan Subrahmanya, Sunnyvale, CA (US); Thomas K. Rowland, Los Gatos, CA (US)

(73) Assignee: Qualcomm Incorporated, San Diego, CA (US)

( * ) Notice: Subject to any disclaimer, the term of this patent is extended or adjusted under 35 U.S.C. 154(b) by 502 days.

(21) Appl. No.: 10/684,771

(22) Filed: Oct. 14, 2003

(65) Prior Publication Data

US 2005/0079846 A1    Apr. 14, 2005

(51) Int. Cl.
*H04B 1/06*    (2006.01)
*H04L 7/04*    (2006.01)

(52) U.S. Cl. ............... 455/255; 455/258; 455/259; 455/260; 455/265

(58) Field of Classification Search ............ 455/255, 455/260, 265, 552.1, 259, 180.3, 182.1, 183.1, 455/188.1, 190, 313, 258, 264, 87, 147, 182.2–183.2, 455/190.1–191.1, 192.1–192.2, 208–209, 455/315, 318; 375/362, 372, 376, 157; 342/357
See application file for complete search history.

(56) References Cited

U.S. PATENT DOCUMENTS

| | | | | |
|---|---|---|---|---|
| 5,734,975 A | * | 3/1998 | Zele et al. ............... | 455/307 |
| 5,781,600 A | * | 7/1998 | Reeve et al. ............... | 375/376 |
| 5,825,327 A | * | 10/1998 | Krasner .................. | 342/357.09 |
| 5,946,292 A | * | 8/1999 | Tsujishita et al. .......... | 370/204 |
| 6,041,222 A | * | 3/2000 | Horton et al. ............. | 455/255 |
| 6,107,960 A | | 8/2000 | Krasner .................. | 342/357.09 |
| 6,424,229 B1 | * | 7/2002 | Justice et al. ................ | 331/4 |
| 6,424,826 B1 | * | 7/2002 | Horton et al. ............. | 455/255 |
| 6,686,803 B1 | * | 2/2004 | Perrott et al. ................ | 331/10 |
| 6,901,265 B2 | * | 5/2005 | Pratt ...................... | 455/456.6 |
| 6,927,637 B1 | * | 8/2005 | Koh et al. .................. | 331/17 |
| 6,965,754 B2 | * | 11/2005 | King ...................... | 455/12.1 |
| 7,010,307 B2 | * | 3/2006 | Abraham ................. | 455/456.1 |
| 2003/0069036 A1 | | 4/2003 | Forrester ................... | 455/552 |

FOREIGN PATENT DOCUMENTS

| | | |
|---|---|---|
| EP | 1501201 | 1/2005 |
| WO | 9913595 | 3/1999 |
| WO | 03089952 | 10/2003 |

* cited by examiner

*Primary Examiner*—Pablo N. Tran
(74) *Attorney, Agent, or Firm*—Thomas Rouse; Bruce W. Greenhaus; Andrea L. Mays

(57) ABSTRACT

Systems and techniques are disclosed relating to wireless communications. These systems and techniques involve wireless communications wherein a device may be configured to recover an information signal from a carrier using a reference signal, detect a frequency error in the information signal; and periodically tune the reference signal to reduce the frequency error.

27 Claims, 4 Drawing Sheets

TELECOMMUNICATIONS USING A TUNABLE OSCILLATOR

BACKGROUND

1. Field

The present invention relates generally to electronics, and more specifically, to telecommunications using a tunable oscillator.

2. Background

Consumer demand for mobile wireless services has led to the development of an ever increasing number of cellular networks. One such network is based on code division multiple access (CDMA) technology which supports wireless voice and data services using spread-spectrum communications. In spread-spectrum communications, a large number of signals share the same frequency spectrum and, as a result, provide a high level of user capacity. This is achieved by transmitting each signal with a different pseudo-noise (PN) code that modulates a carrier, and thereby, spreads the signal. The transmitted signals are separated in the receiver by a correlator that uses a corresponding PN code to despread the signal. The undesired signals, whose codes do not match, are not despread and contribute only to noise.

A competing network which has become the defacto standard in Europe and Asia is Global System for Mobile Communications (GSM) technology. Unlike CDMA, GSM uses narrowband time division multiple access (TDMA) technology to support wireless voice and data services. Other popular networks that have evolved over the years using TDMA technology include General Packet Radio Service (GPRS) and EDGE, both which support high speed data services. These networks may be dispersed throughout the geographic landscape, each with its own unique set of protocols, services, and data rates.

Today, wireless communication devices are being deployed with technology that supports multiple cellular networks. Typically, these devices are equipped with a dedicated receiver for each network. A local oscillator (LO) circuit may be used to provide a stable reference signal to each receiver. The stable reference signal may be used by each individual receiver to recover information signals from a high frequency carrier. The LO circuit is typically implemented with a crystal oscillator driving several frequency multiplier circuits. The frequency multiplier circuits may be individually programmed to provide a reference signal to each receiver at the proper frequency. In order to maintain good receiver performance, a highly accurate and stable crystal oscillator is often employed. Alternatively, a tunable oscillator, such as a voltage controlled temperature compensated crystal oscillator (VCTCXO) may be used. A frequency tracking loop may be used to tune the oscillator to compensate for manufacturing tolerances, Doppler frequency shifts, and drift.

In more advanced systems, wireless communication devices may be equipped with a Global Positioning System (GPS) receiver. GPS is part of a satellite based navigation system developed by the United States Department of Defense. It provides global coverage with navigational capability under various environmental conditions. In a fully operational GPS, the entire surface of the earth is covered by up to twenty-four satellites dispersed in six orbits with four satellites in each orbit. A GPS receiver in the wireless communications device uses signals modulated by a pseudo-random-noise (PRN) code from multiple satellites to pinpoint its exact location on earth. The raw data generated from the GPS receiver may be used for various applications. By way of example, the raw data may be plugged into map files stored in memory.

To improve the economic viability of these wireless communication devices, the GPS receiver often shares a common LO circuit with the cellular receivers. The problem with this approach is that the performance of the GPS receiver may be degraded if the crystal oscillator in the LO circuit is being tuned by the frequency tracking loop during GPS operation. Accordingly, there is a need for an innovative approach that can be used to tune a crystal oscillator in an LO circuit without degrading the performance of the GPS receiver.

SUMMARY

In one aspect of the present invention, a communications device includes a tunable oscillator configured to produce a reference signal, a receiver configured to recover an information signal from a carrier using the reference signal, and a processor configured to detect a frequency error in the information signal, and periodically tune the oscillator to reduce the frequency error.

In another aspect of the present invention, a communications device includes a tunable oscillator configured to produce a reference signal, a receiver configured to recover an information signal from a carrier using the reference signal, and a processor configured to detect a frequency error in the information signal, and tune the oscillator if the frequency error crosses a threshold.

In yet another aspect of the present invention, a method of communications includes recovering an information signal from a carrier using a reference signal, detecting a frequency error in the information signal, and periodically tuning the reference signal to reduce the frequency error.

In a further aspect of the present invention, a communications device includes means for producing a reference signal, means for recovering an information signal from a carrier using the reference signal, means for detecting a frequency error in the information signal, and means for periodically tuning the reference signal to reduce the frequency error.

It is understood that other embodiments of the present invention will become readily apparent to those skilled in the art from the following detailed description, wherein it is shown and described only several embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention. In addition, for the purposes of this disclosure, the term "coupled" means "connected to" and such connection can either be direct or, where appropriate in the context, can be indirect, e.g., through intervening or intermediary devices or other means.

A wireless communications device may be used to access a network or communicate with other communication devices through one or more cellular networks. By way of example, the wireless communications device may be designed to communicate over a wideband code division multiple access (WCDMA) cellular network. Alternatively, the wireless communications device may be designed to communicate over a GSM, GPRS, EDGE, or any other cellular network. In at least one embodiment, the wireless communications device may be designed to operate over multiple cellular networks and have GPS capability. The wireless communications device, typically referred to as a subscriber station, may be any type of wireless device that can communicate over a wireless medium with a cellular network including, but not limited to, a wireless phone or terminal, a computer, a modem, a personal digital assistant and the like.

Figure 1:
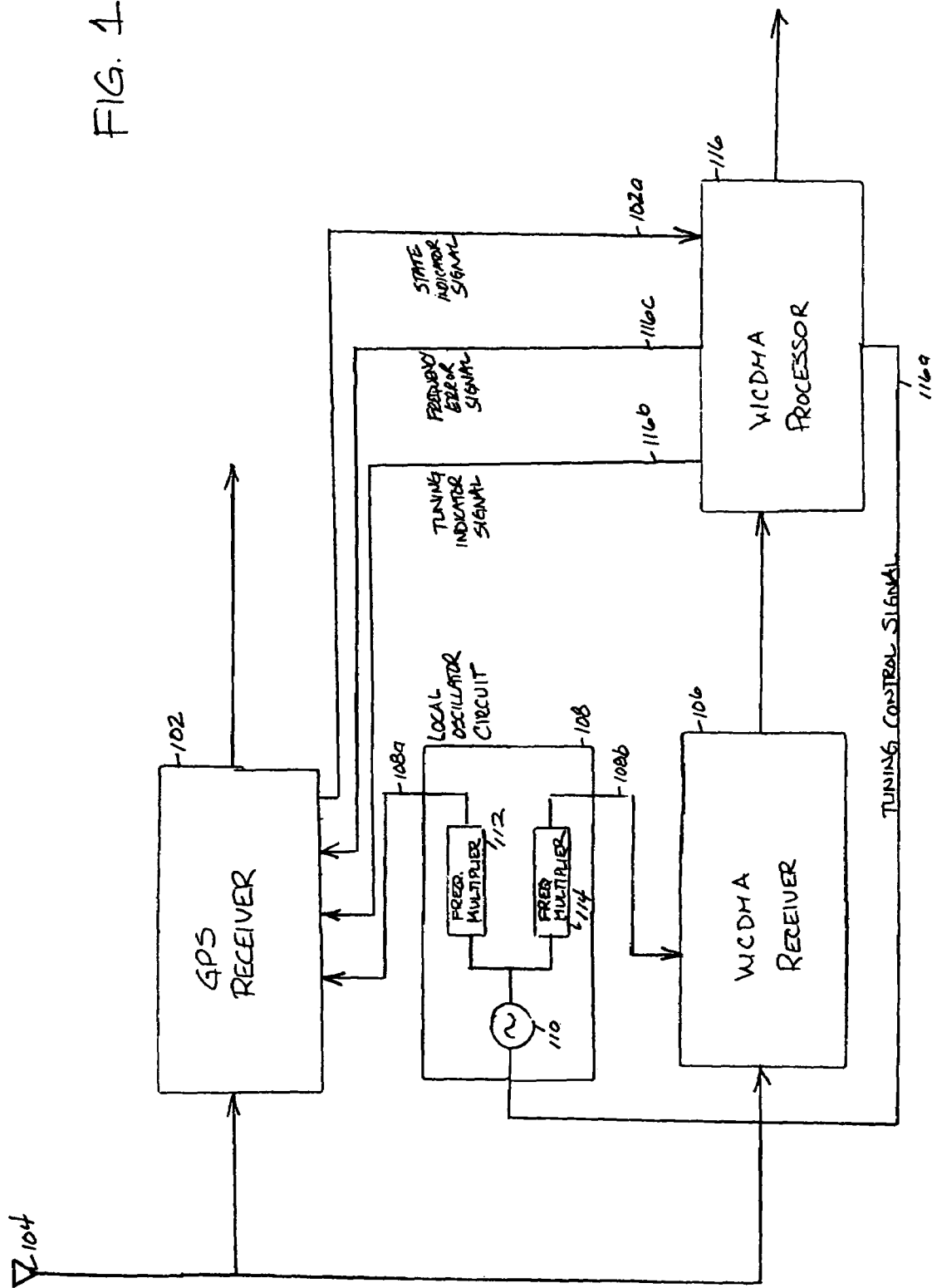
FIG. 1 is a conceptual block diagram illustrating a functional example of a receiver system for a wireless communications device.

A functional block diagram of a receiver system for a wireless communications device is shown in FIG. 1. The receiver system may include a GPS receiver 102 with an antenna 104. The GPS receiver 102 may be implemented with a heterodyne architecture with an intermediate frequency (IF). The receiver system may also include one or more cellular receivers including, by way of example, a WCDMA, GSM, GPRS, EDGE and/or any other cellular receiver. For ease of explanation, the receiver system is shown with a single direct conversion heterodyne cellular receiver 106 designed for WCDMA operation. Those skilled in the art will be readily able to apply the inventive concepts described throughout this disclosure to multiple cellular receiver designs. The WCDMA receiver 106 may share the antenna 104 with the GPS receiver 102, or alternatively, may be equipped with its own. In the embodiment shown in FIG. 1, both the GPS receiver 102 and the WCDMA receiver 106 are coupled to the same antenna 104 to reduce cost.

A LO circuit 108 may be used to provide a stable reference signal to each receiver at the appropriate frequency. The LO circuit 108 may be implemented with a tunable oscillator 110, such as a VCTCXO or other similar circuit, coupled to a pair of frequency multiplier circuits 112 and 114. The first frequency multiplier circuit 112 may be used to generate a GPS reference signal 108$a$ suitable to convert a GPS Doppler carrier to an IF signal. The second frequency multiplier circuit 114 may be used to generate a WCDMA reference signal 108$b$ suitable to convert a WCDMA radio frequency (RF) carrier to a baseband signal. Additional frequency multiplier circuits may be used to support additional cellular receivers that may be present in alternative embodiments of the receiver system. The voltage applied to the tuning input of the oscillator 110 may be biased to compensate for manufacturing tolerances in frequency.

The GPS receiver 102 may include any number of amplifier stages and filters to increase gain and reduce front end noise of the GPS signals from the antenna 104. The GPS signals may also be downconverted to IF signals through a mixing operation with the GPS reference signal 108$a$ from the LO circuit 108 and sampled to produce a digital baseband signal. The digital baseband signal may then be code-correlated, demodulated and signal processed to obtain a navigational solution. The signal processing function may be performed by a computing algorithm that is enabled by the user, or alternatively, by the network. When the computing algorithm is enabled, the GPS receiver 102 is said to be in an "active" state. Once the GPS receiver 102 obtains the navigational solution, it enters an "idle" state until enabled again by the user or the network.

The function of the WCDMA receiver 106 is to amplify, filter and downconvert information signals from a WCDMA cellular network for use by a WCDMA processor 116. In a manner similar to the GPS receiver 102, the WCDMA receiver 108 may use any number of amplifier stages and filters to process carrier signals from the antenna 104. The information signals may be recovered from the carrier through a mixing operation with the WCDMA reference signal 108. The baseband signal from the WCDMA receiver 106 may then be provided to the WCDMA processor 116. The WCDMA processor 116 may be used to generate demodulated, error-corrected data from the information signals. The data may be text, video, audio, or any other type of data.

The WCDMA processor 116 may be responsible for tuning the LO circuit 108. The tuning operation should be done in a way that minimizes the impact on other receivers. In the embodiment of the receiver system described thus far, the performance of the GPS receiver 102 may be degraded during LO tuning, and the WCDMA processor 116 should be implemented with this in mind. One way to reduce the potential impact on other receivers is to limit the tuning period of the LO circuit 108. The criteria for limiting the tuning period may vary depending on the preferences of the designer, the particular communications application and the overall design constraints. In at least one embodiment of the WCDMA processor 116, the LO circuit 108 may be tuned for a short duration of time at repeated frequency intervals. In another embodiment of the WCDMA processor 116, the LO circuit 108 may be tuned only when the frequency error in the baseband signal exceeds a threshold. Those skilled in the art will be readily able to determine the criteria most suitable to the particular application for controlling the periodic tuning of the LO circuit 108.

To illustrate the operation of the WCDMA processor 116, a periodic tuning algorithm will be described. For the purposes of this disclosure, the term "periodic" and "periodically" will mean "on occasion" without regard to the time period or frequency of the LO tuning operation. In the described embodiment, the WCDMA processor 116 may include a frequency tracking function to detect frequency errors in the baseband signal. The frequency tracking function may be used to compensate the baseband signal for small frequency errors. For larger frequency errors, a tuning control signal 116*a* may be generated by the WCDMA processor 116 to tune the LO circuit 108 by adjusting the voltage applied to the tuning input of the oscillator 110. To ensure high performance, the frequency tracking function should provide baseband signal compensation even during LO tuning. One or more thresholds may be established in the WCDMA processor 116 and compared against the frequency error to determine whether the LO circuit 108 should be tuned. These thresholds may be different depending on whether the GPS receiver 102 is in the active or idle state. A state indicator signal 102*a* may be provided from the GPS receiver 102 to the WCDMA processor 116 to set the thresholds. The thresholds may also be different depending on the type of cellular receiver. By way of example, the thresholds for a WCDMA receiver may be different from the thresholds for a GSM receiver. Those skilled in the art will be readily able to determine the appropriate thresholds for their particular application based on the overall design constraints and performance parameters.

In at least one embodiment of the WCDMA processor 116, a first threshold may be used to begin the tuning operation of the LO circuit 108. The first threshold may be selected to best accommodate WCDMA operation and may be adjustable depending upon whether the GPS receiver 102 is in the active or idle state. To prevent GPS performance degradation during LO tuning, a tuning indicator signal 116*b* may be generated by the WCDMA processor 116 and provided to the GPS receiver 102 to disable GPS operation.

Once the tuning operation begins, the WCDMA processor 116 may continue tuning the LO circuit 108 until the frequency error drops below a second threshold. Like the first threshold, the second threshold may be selected to best accommodate WCDMA operation and may be adjustable depending upon whether the GPS receiver 102 is in the active or idle state. Once the frequency error drops below the second threshold, the tuning operation may be terminated, and the tuning indicator signal 116*b* may be used to signal the GPS receiver 102 to resume operation.

Before the GPS receiver 102 can resume operation, it must first reacquire the GPS signal. Acquisition is a coarse synchronization process giving estimates of the PRN code offset and the Doppler carrier. The process involves a two dimensional search through space and frequency in which a replica code and carrier are aligned with the received GPS signal. Multiple frequency hypotheses may be required to complete the acquisition process. To reduce the time it takes for signal acquisition, a frequency error signal 116*c* generated by the frequency tracking function of the WCDMA processor 116 may be provided to the GPS receiver 102. This information may be used by the GPS receiver 102 to limit the search through the frequency spectrum for the Doppler carrier.

Figure 2:
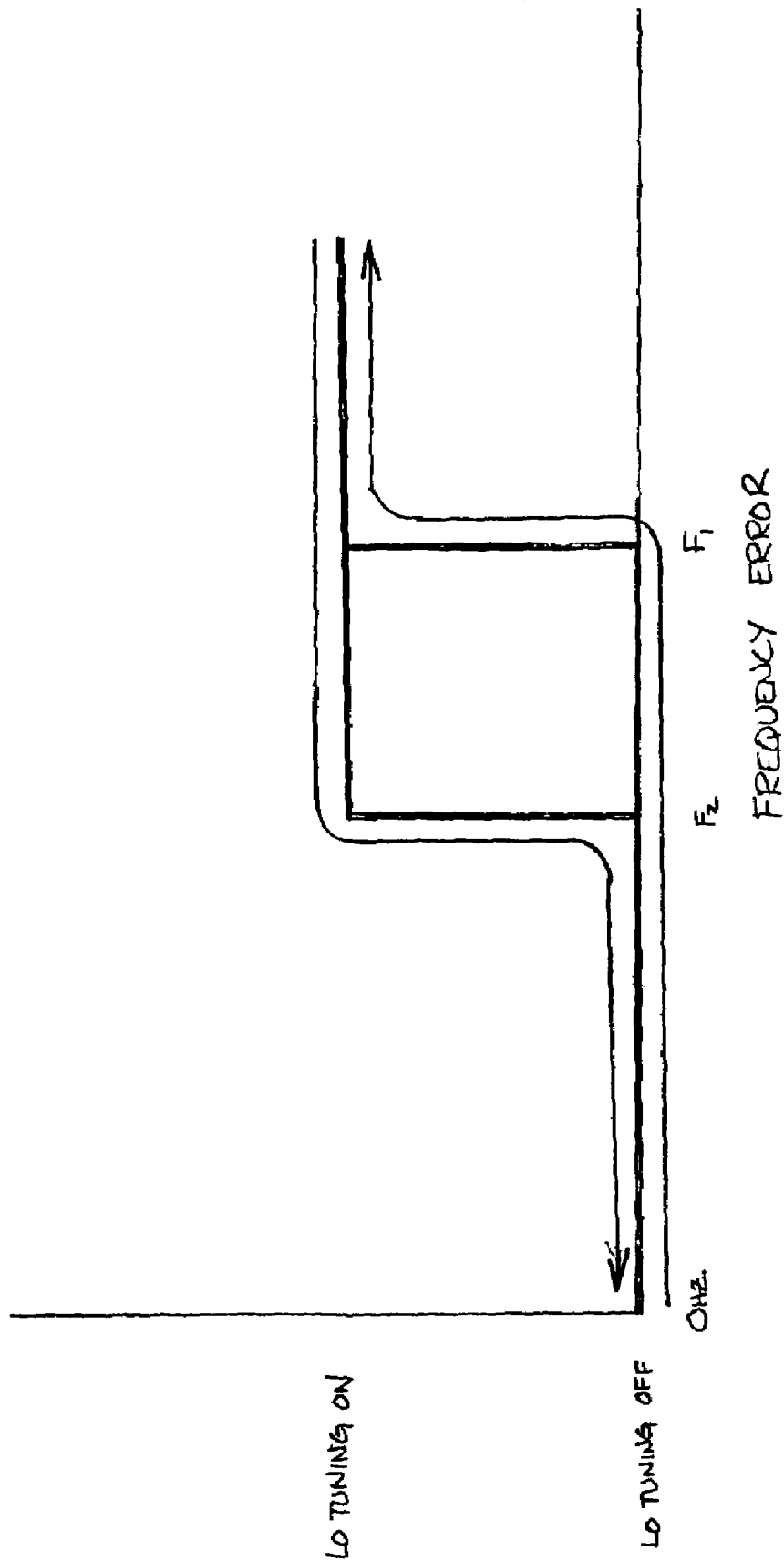
FIG. 2 is a graphical illustration showing an example of a periodic tuning operation for a LO circuit in a wireless communications device.

The first and second thresholds may be different. The effect of this approach is to add an element of hysteresis to the tuning operation of the LO circuit 108. This concept will be described with reference to FIG. 2 which plots the LO tuning operation as a function of frequency error. Referring to FIG. 2, one can readily see that as the frequency error increases from 0 Hz. to the first threshold frequency $F_1$, the LO tuning operation is not performed. Below the first threshold frequency $F_1$, the baseband signal may be compensated in the WCDMA processor for the frequency error. Should the frequency error, however, cross the first threshold frequency $F_1$, the WCDMA processor 116 begins tuning the LO circuit 108 to reduce the frequency error. The LO tuning operation continues until the frequency error drops below the second threshold frequency $F_2$. The separation between the threshold frequencies $F_1$ and $F_2$ may be optimized by those skilled in the art to minimize the overall tuning duration of the LO circuit 108.

Figure 3:
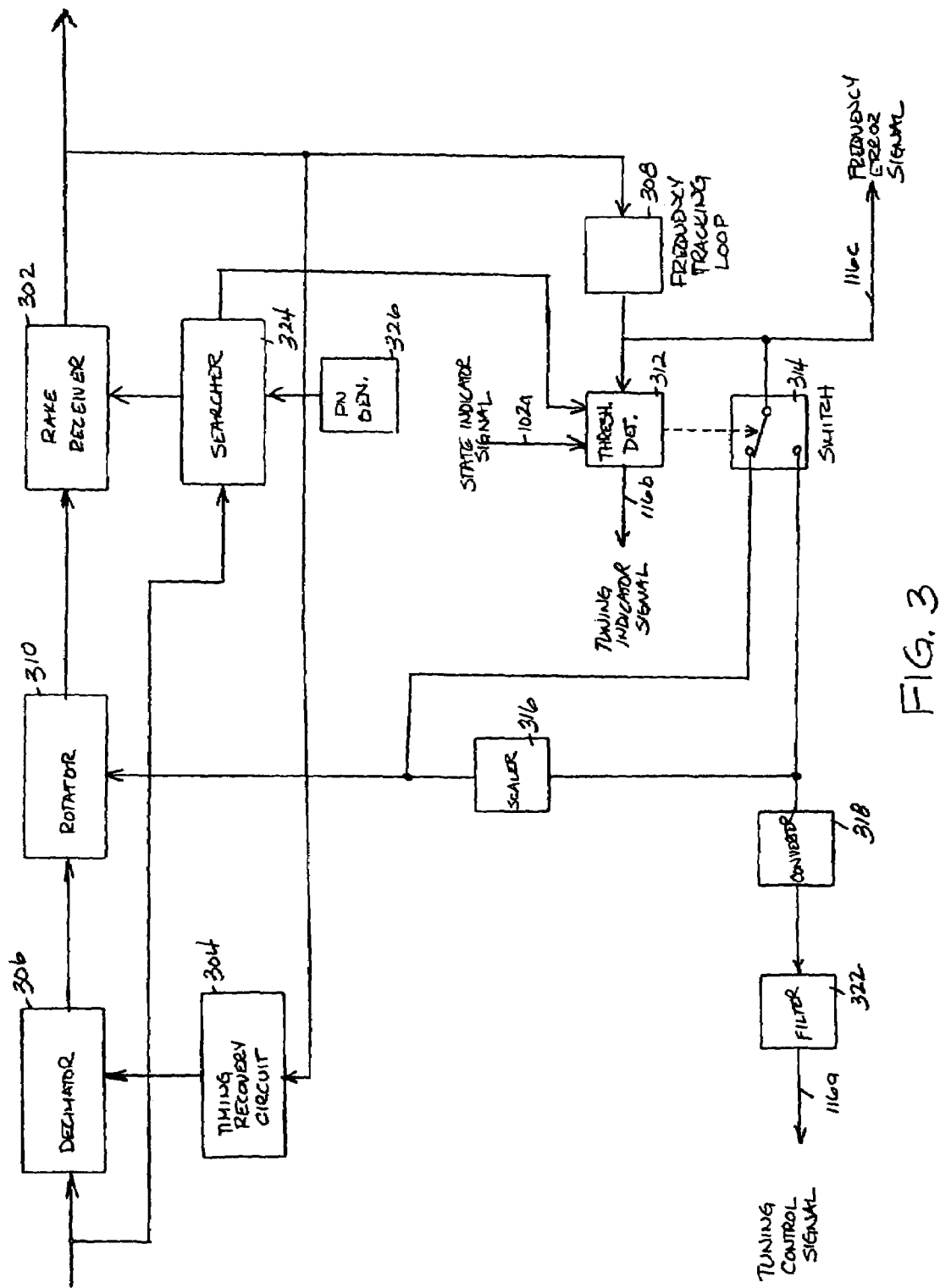
FIG. 3 is a conceptual block diagram illustrating a functional example of a WCDMA processor in a wireless communications device.

A functional block diagram of a WCDMA processor is shown in FIG. 3. The WCDMA processor may be implemented with a complex (I-Q) architecture. For ease of explanation, the WCDMA processor 116 will be depicted functionally in FIG. 3 without reference to separate I (in-phase) and Q (quadrature) channels. The WCDMA processor 116 includes carrier and timing recovery circuits feeding a rake receiver 302. The rake receiver 302 may use independent fading of resolvable multipaths to achieve diversity gain. Specifically, the rake receiver 302 may be configured to process one or more multipaths of a downlink transmission to the wireless communications device. Each multipath may be fed into a separate finger processor to perform PN code despreading and orthogonal variable spreading factor (OVSF) code decovering. The rake receiver 302 may then be used to combine the result from each finger processor to recover the symbols transmitted over the downlink transmission.

The rake receiver output may be used to drive a timing recovery loop 304. Timing recovery refers to the process of extracting timing information from the downlink transmission and using the timing information to synchronize a local clock. This clock (not shown) may then be used to sample the digital baseband signal from the WCDMA receiver 106 (see FIG. 1). Specifically, the timing recovery loop 304 may be used to estimate the timing error between the symbols recovered by the RAKE receiver 302 and the local clock rate, and adjust the local clock to minimize the timing error. The local clock (not shown) may then be used to control the sampling phase of a decimator 306. Timing recovery circuits are well known in the art.

The rake receiver output may also be used to drive a frequency tracking loop 308. The frequency tracking loop 308 may be used in conjunction with a rotator 310 to compensate for frequency errors in the baseband signal. The rotator 310 may be implemented with a complex multiplier or other similar device. The frequency error may be computed by any number of techniques well known in the art.

Figure 4:
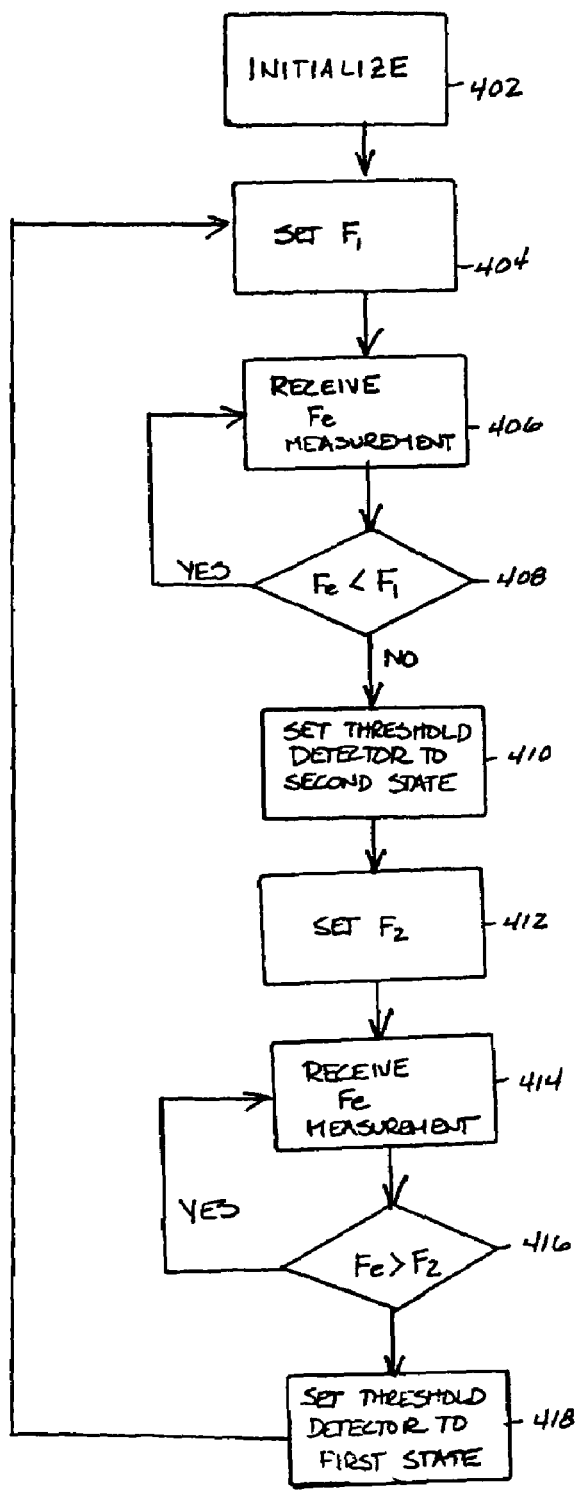
FIG. 4 is a flow diagram illustrating a functional example of the operation of a threshold detector in a WCDMA processor which may be used in conjunction with the LO tuning operation.

The frequency error computed by the frequency tracking loop 308 may be provided to a threshold detector 312. In a manner to be described in greater detail later, the threshold detector 312 may be used to control the periodic tuning of the LO circuit 108 (see FIG. 1). The operation of the threshold detector 312 will be described with reference to the flow diagram of FIG. 4. In step 402, the threshold detector may be initialized, typically with the application of power. The threshold detector should remain in the initialization state during signal acquisition. During the initialization state, the threshold detector may be set to a first state. Although not shown in FIG. 4, should the WCDMA processor ever need to reacquire the signal, the threshold detector should be forced back into the initialization state.

Once the WCDMA processor acquires the signal, the threshold detector may exit the initialization state and set the first threshold $F_1$ in step 404. The first threshold $F_1$ may be adjusted depending on whether the GPS receiver is in the active or idle state. In step 406, the threshold detector receives a frequency error measurement $F_e$ from the frequency tracking loop and compares it to the first threshold $F_1$ in step 408. If the measured frequency error $F_e$ is less than the first threshold $F_1$, then the threshold detector loops back to step 406 to await the next frequency error measurement $F_e$ from the frequency tracking loop. If, on the other hand, the measured frequency error $F_e$ exceeds the first threshold $F_1$, then the threshold detector may be set to a second state in step 410.

Once the threshold detector output is set to the second state, the second threshold $F_2$ may be set in step 412. The second threshold $F_2$ may be adjusted depending on whether the GPS receiver is in the active or idle state. In step 414, the threshold detector receives a new frequency error measurement $F_e$ from the frequency tracking loop and compares it to the second threshold $F_2$ in step 416. If the measured frequency error $F_e$ is greater than the second threshold $F_2$, then the threshold detector loops back to step 414 to await the next frequency error measurement $F_e$ from the frequency tracking loop. If, on the other hand, the measured frequency error $F_e$ drops below the threshold $F_2$, then the threshold detector output may be set back to the first state in step 418. The threshold detector then loops back to step 404 to await the next frequency error measurement $F_e$ from the frequency tracking loop.

Returning to FIG. 3, the threshold detector 312 may be used to control a switch 314. The switch 314 may be used to demultiplex the frequency error computed by the frequency tracking loop 308 onto one of two output lines depending on the state of the threshold detector 312. When the threshold detector 312 is in the first state, the frequency error may be coupled to the rotator 310 through the switch 314. In this mode, the frequency error may be used to compensate the baseband signal without tuning the LO circuit 108 (see FIG. 1).

The switch 314 may also be configured to couple the frequency error from the frequency tracking loop 308 to a converter 318 when the threshold detector 312 is in the second state. The converter 318 may be used to generate a pulse width modulated signal corresponding to the frequency error. A filter 322 may be used to convert the pulse width modulated signal to an analog voltage. The analog voltage is the tuning control signal 116*a* used to provide coarse tuning of the LO circuit 108 (see FIG. 1). A scaler 316 may be used to produce a digital signal that can be applied to the rotator 310 to provide fine tuning in the digital domain. To prevent GPS performance degradation, the threshold detector 312 may also be used to disable GPS operation through the tuning indicator signal 116*b* when the threshold detector 312 is in the second state. The frequency error signal 116*c* from the frequency tracking loop 308 may also be provided to the GPS receiver 102 (see FIG. 1) to facilitate reacquisition of the GPS signal once the LO circuit 108 (see FIG. 1) is tuned.

The WCDMA processor may also include a searcher 324 for signal acquisition and synchronization. The acquisition process involves a search through an unknown region of time and frequency in order to bring a spread spectrum pilot signal into coarse alignment with a replica code. A PN code generator 326 may be used to sequence through the different PN codes for multiple frequency hypothesis. The searcher 324 may also be used to force the threshold detector 312 into the first state during signal acquisition. With this approach, the signal acquisition process may be performed without tuning the LO circuit 108 (see FIG. 1) and disturbing GPS operation. Once the acquisition process is complete, the searcher 324 may use the pilot signal to identify strong multipath arrivals and assign the fingers in the rake receiver 302. The rake receiver 302 uses the fingers as a timing reference to correlate the signal for each anticipated multipath reflection.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the embodiments disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A communications device, comprising:
   a tunable oscillator configured to produce a first reference signal and to produce a second reference signal;
   a first receiver configured to recover first information signal from a first carrier using the first reference signal;
   a second receiver configured to recover a second information signal from a second carrier using the second reference signal, the second receiver being configured to operate in an active state and an idle state; and
   a processor configured to detect a frequency error in the information signal, periodically tune the oscillator to reduce the frequency error and to enable the tuning of the oscillator if the frequency error crosses a first threshold, and once enabled, continue tuning the oscillator until the frequency error is reduced below a second threshold, wherein the first and second thresholds are a function of the state of the second receiver.

2. The communications device of claim 1 wherein the processor further comprises a rotator configured to compensate for the frequency error concurrently with the periodic tuning of the oscillator.

3. The communications device of claim 2 wherein the processor is further configured to operate in a acquisition state and a synchronized state, the processor being further configured to acquire the first carrier without tuning the oscillator during the acquisition state, and periodically tune the oscillator to reduce the frequency error and use the rotator to compensate for the frequency error during the synchronized state.

4. The communications device of claim 1 wherein, the processor being further configured to disable the second receiver during the tuning of the oscillator.

5. The communications device of claim 4 wherein the processor is further configured to provide to the second receiver a signal relating to the frequency error, and wherein the second receiver is farther configured to use the signal relating to the frequency error to acquire the second carrier following the tuning of the oscillator.

6. The communications device of claim 1 wherein the second receiver comprises a Global Positioning Satellite receiver.

7. The communications device of claim 6 wherein the processor comprises a wide band code division multiple access processor.

8. The communications device of claim 1 wherein the first threshold is greater than the second threshold.

9. The communications device of claim 1 wherein the processor is further configured to interface to a particular communications network, and wherein the first and second thresholds are a function of the particular communications network for which the processor is configured to interface with.

10. The communications device of claim 1 wherein the second receiver comprises a Global Positioning Satellite receiver, the Global Positioning Satellite receiver being in the active state when computing a navigational solution.

11. A communications device, comprising:
    a tunable oscillator configured to produce a first reference signal and a second reference signal;
    a first receiver configured to recover first information signal from a first carrier using the first reference signal;
    a second receiver configured to recover a second information signal from a second carrier using the second reference signal and to operate in an active state and an idle state; and
    a processor configured to detect a frequency error in the first information signal, and tune the oscillator if the frequency error crosses a first threshold, wherein the first threshold is a function of the state of the second receiver, the processor being further configured to disable the second receiver during the tuning of the oscillator.

12. The communications device of claim 11 wherein the processor is further configured to tune the oscillator once the frequency error crosses the first threshold until the frequency error is reduced below a second threshold.

13. The communications device of claim 12 wherein the first threshold is greater than the second threshold.

14. The communications device of claim 11 wherein the processor is further configured to interface to a particular communications network, and wherein the first threshold is a function of the particular communications network for which the processor is configured to interface with.

15. The communications device of claim 11 wherein the processor is further configured to provide to the second receiver a signal relating to the frequency error, and wherein the second receiver is further configured to use the signal relating to the frequency error to acquire the second carrier following the tuning of the oscillator.

16. The communications device of claim 11 wherein the second receiver comprises a Global Positioning Satellite receiver.

17. The communications device of claim 16 wherein the processor comprises a wide band code division multiple access processor.

18. The communications device of claim 11 wherein the second receiver comprises a Global Positioning Satellite receiver, the Global Positioning Satellite receiver being in the active state when computing a navigational solution.

19. A method of communications, comprising:
    recovering a first information signal from a first carrier using a first reference signal;
    periodically computing a navigational solution from a second information signal from a Global Positioning Satellite system, the second information signal being recovered from a second carrier using a second reference signal;
    detecting a frequency error in the first information signal; and
    periodically tuning the first reference signal to reduce the frequency error and enabling the tuning of the first reference signal when the frequency error crosses a first threshold, and once enabled, continuing to tune the first reference signal until the frequency error is reduced below a second threshold, the first reference signal and the second reference signal being generated from a common oscillator, and wherein the first and second thresholds are a function of whether the computational solution is being computed.

20. The method of claim 19 further comprising rotating the first information signal to compensate for the frequency error concurrently with the periodic tuning of the first reference signal.

21. The method of claim 20 further comprising acquiring the first carrier without tuning the first reference signal, and wherein the periodic tuning of the first reference signal together with the rotation of the first information signal is performed following the first carrier acquisition.

22. The method of claim 19 farther comprising disabling recovery of the second information signal during the tuning of the first reference signal, the first reference signal and the second reference signal being generated from a common oscillator.

23. The method of claim 22 farther comprising generating a signal relating to the frequency error, and using the signal to acquire the second carrier following the tuning of the first reference signal.

24. The method of claim 22 wherein the second carrier with the second information signal is from a Global Positioning Satellite system.

25. The method of claim 24 wherein the first carrier with the first information signal comprises a wide band code division multiple access network.

26. The method of claim 19 wherein the first threshold is greater than the second threshold.

27. The method of claim 19 further comprising receiving the first carrier with the first information signal from a particular communications network, and wherein the first and second thresholds are a function of the particular communications network from which the first carrier is received.

* * * * *